United States Patent
Serrano Molina et al.

(10) Patent No.: US 6,956,299 B2
(45) Date of Patent: Oct. 18, 2005

(54) SYSTEM FOR GENERATING ENERGY FROM THE WAVES OF THE SEA

(75) Inventors: José Antonio Serrano Molina, Barcelona (ES); José Antonio Serrano Cabello, Barcelona (ES); Juan Manuel Arcos Montes, Montcada I Reixac (ES); Ferran Josep Puerta Sardo, Terrasa (ES); Manuel Antonio Garcia-Calvillo Miralles, Esparreguera (ES); José Doroteo Lopez Huete, L'Hospitalet de Llobregat (ES)

(73) Assignee: Arlas Invest, S.L., Montcada (ES)

( * ) Notice: Subject to any disclaimer, the term of this patent is extended or adjusted under 35 U.S.C. 154(b) by 78 days.

(21) Appl. No.: 10/450,089

(22) PCT Filed: Dec. 7, 2001

(86) PCT No.: PCT/ES01/00477

§ 371 (c)(1),
(2), (4) Date: Jun. 10, 2003

(87) PCT Pub. No.: WO02/48544

PCT Pub. Date: Jun. 20, 2002

(65) Prior Publication Data

US 2004/0046396 A1 Mar. 11, 2004

(30) Foreign Application Priority Data

Dec. 11, 2000 (ES) ............................................ 200003028

(51) Int. Cl.$^7$ ......................... F03B 13/12; F03B 13/10; E02B 9/08; H02P 9/04
(52) U.S. Cl. ............................. 290/42; 290/53; 60/496; 60/497; 60/507
(58) Field of Search ................. 290/42, 53; 60/495–507

(56) References Cited

U.S. PATENT DOCUMENTS

| | | | | |
|---|---|---|---|---|
| 1,455,718 A | * | 5/1923 | Delong | 417/100 |
| 2,422,337 A | * | 6/1947 | Chilowsky | 367/4 |
| 3,030,893 A | * | 4/1962 | Shaffer | 417/331 |
| 3,200,255 A | * | 8/1965 | Masuda | 290/42 |
| 3,204,110 A | * | 8/1965 | Masuda | 290/42 |
| 3,362,336 A | * | 1/1968 | Kafka | 417/331 |
| 3,515,889 A | * | 6/1970 | Kammerer | 290/53 |
| 3,546,473 A | * | 12/1970 | Rich | 290/42 |
| 3,696,251 A | * | 10/1972 | Last et al. | 290/53 |
| 3,777,494 A | * | 12/1973 | Soderlund | 60/507 |
| 3,783,302 A | * | 1/1974 | Woodbridge | 290/42 |
| 3,912,938 A | * | 10/1975 | Filipenco | 290/53 |
| 4,091,618 A | * | 5/1978 | Jackson | 60/497 |
| 4,151,051 A | * | 4/1979 | Evans | 205/339 |
| 4,184,335 A | * | 1/1980 | Byrne | 60/496 |
| 4,196,591 A | * | 4/1980 | Wallace | 60/497 |
| 4,208,877 A | * | 6/1980 | Evans et al. | 60/495 |
| 4,228,360 A | * | 10/1980 | Navarro | 290/43 |
| 4,241,579 A | * | 12/1980 | Borgren | 60/504 |
| 4,242,593 A | * | 12/1980 | Quilico et al. | 290/53 |
| 4,260,901 A | * | 4/1981 | Woodbridge | 290/42 |
| 4,352,023 A | * | 9/1982 | Sachs et al. | 290/42 |
| 4,355,511 A | * | 10/1982 | Jones | 60/507 |

(Continued)

FOREIGN PATENT DOCUMENTS

| | | | | |
|---|---|---|---|---|
| GB | 2261262 A | * | 5/1993 | F03B/13/16 |
| WO | WO 9913238 A1 | * | 3/1999 | F16D/31/02 |

*Primary Examiner*—Darren Schuberg
*Assistant Examiner*—Pedro J. Cuevas
(74) *Attorney, Agent, or Firm*—Steinberg & Raskin, P.C.

(57) ABSTRACT

Includes at least one floating body (1), and is characterised in that includes a device (2) fitted inside said body (1) for transforming the movement of the floating body (1) into pneumatic or hydraulic energy and means for transmitting the energy to dry land or to a fixed structure. An energy-generation system is obtained thereby with a manufacturing time and cost lower than the systems currently known. Moreover, the fact that the transforming device (2) is fitted inside the floating body (1) means that it is protected against corrosion caused by the water, against sharp movements caused by marine currents and against other possible outside agents which might harm or damage any of the components which make up the device.

15 Claims, 3 Drawing Sheets

U.S. PATENT DOCUMENTS

| | | | | |
|---|---|---|---|---|
| 4,398,095 A | * | 8/1983 | Ono | 290/53 |
| 4,423,334 A | * | 12/1983 | Jacobi et al. | 290/53 |
| 4,434,375 A | * | 2/1984 | Taylor | 290/53 |
| 4,447,740 A | * | 5/1984 | Heck | 290/53 |
| 4,469,955 A | * | 9/1984 | Trepl, II | 290/53 |
| 4,480,966 A | * | 11/1984 | Smith | 417/332 |
| 4,539,485 A | * | 9/1985 | Neuenschwander | 290/53 |
| 4,594,853 A | * | 6/1986 | Raichlen et al. | 60/502 |
| 4,631,921 A | * | 12/1986 | Linderfelt | 60/501 |
| 4,754,157 A | * | 6/1988 | Windle | 290/53 |
| 4,883,411 A | * | 11/1989 | Windle | 417/331 |
| 4,931,662 A | * | 6/1990 | Burton | 290/42 |
| 5,136,173 A | * | 8/1992 | Rynne | 290/53 |
| 5,359,229 A | * | 10/1994 | Youngblood | 290/53 |
| 5,424,582 A | * | 6/1995 | Trepl et al. | 290/53 |
| 5,426,332 A | * | 6/1995 | Ullman et al. | 290/53 |
| 6,020,653 A | * | 2/2000 | Woodbridge et al. | 290/53 |
| 6,229,225 B1 | * | 5/2001 | Carroll | 290/53 |
| 6,269,636 B1 | * | 8/2001 | Hatzilakos | 60/398 |
| 6,392,314 B1 | * | 5/2002 | Dick | 290/53 |
| 6,617,705 B1 | * | 9/2003 | Smalser et al. | 290/42 |
| 6,644,027 B1 | * | 11/2003 | Kelly | 60/498 |
| 6,695,536 B2 | * | 2/2004 | Sanchez Gomez | 405/76 |
| 6,717,284 B2 | * | 4/2004 | Lin | 290/53 |
| 6,731,018 B1 | * | 5/2004 | Grinsted et al. | 290/42 |
| 6,849,963 B2 | * | 2/2005 | Grinsted et al. | 290/42 |
| 6,857,266 B2 | * | 2/2005 | Dick | 60/496 |
| 6,864,592 B1 | * | 3/2005 | Kelly | 290/42 |

* cited by examiner

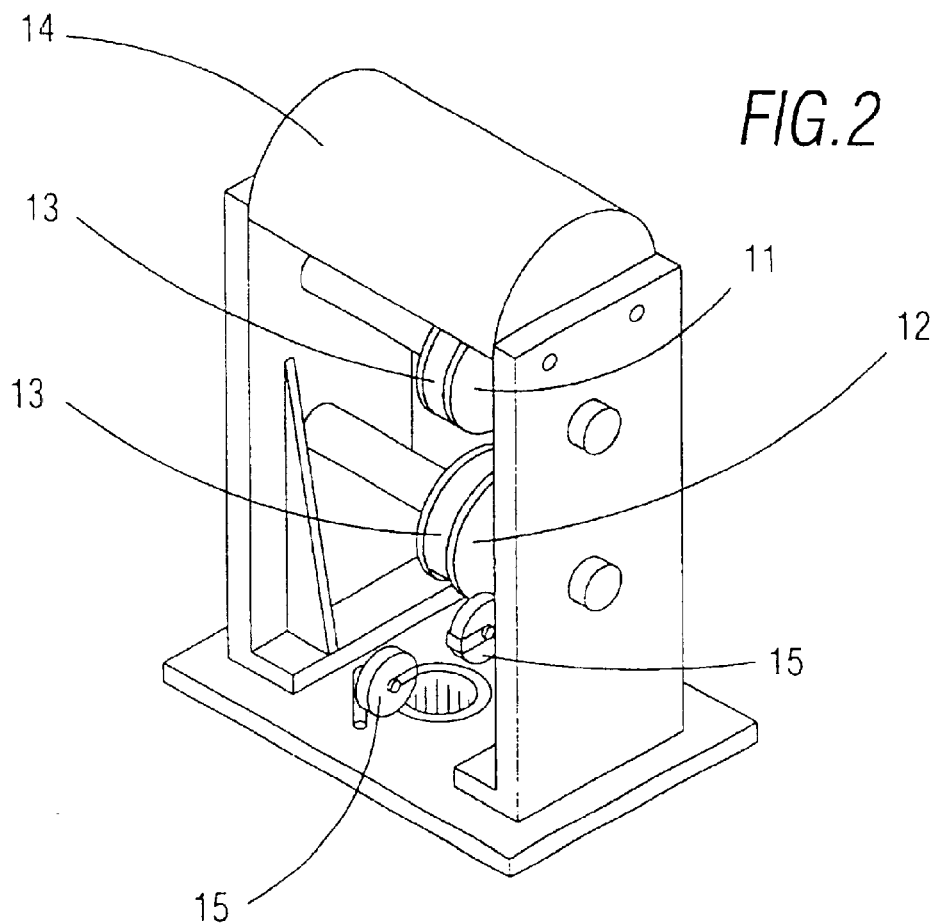
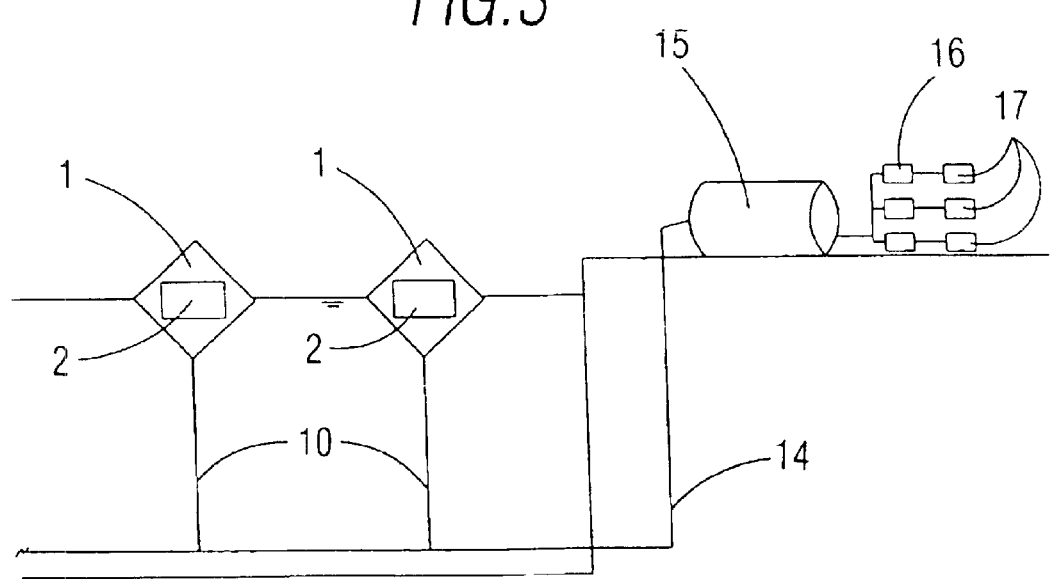

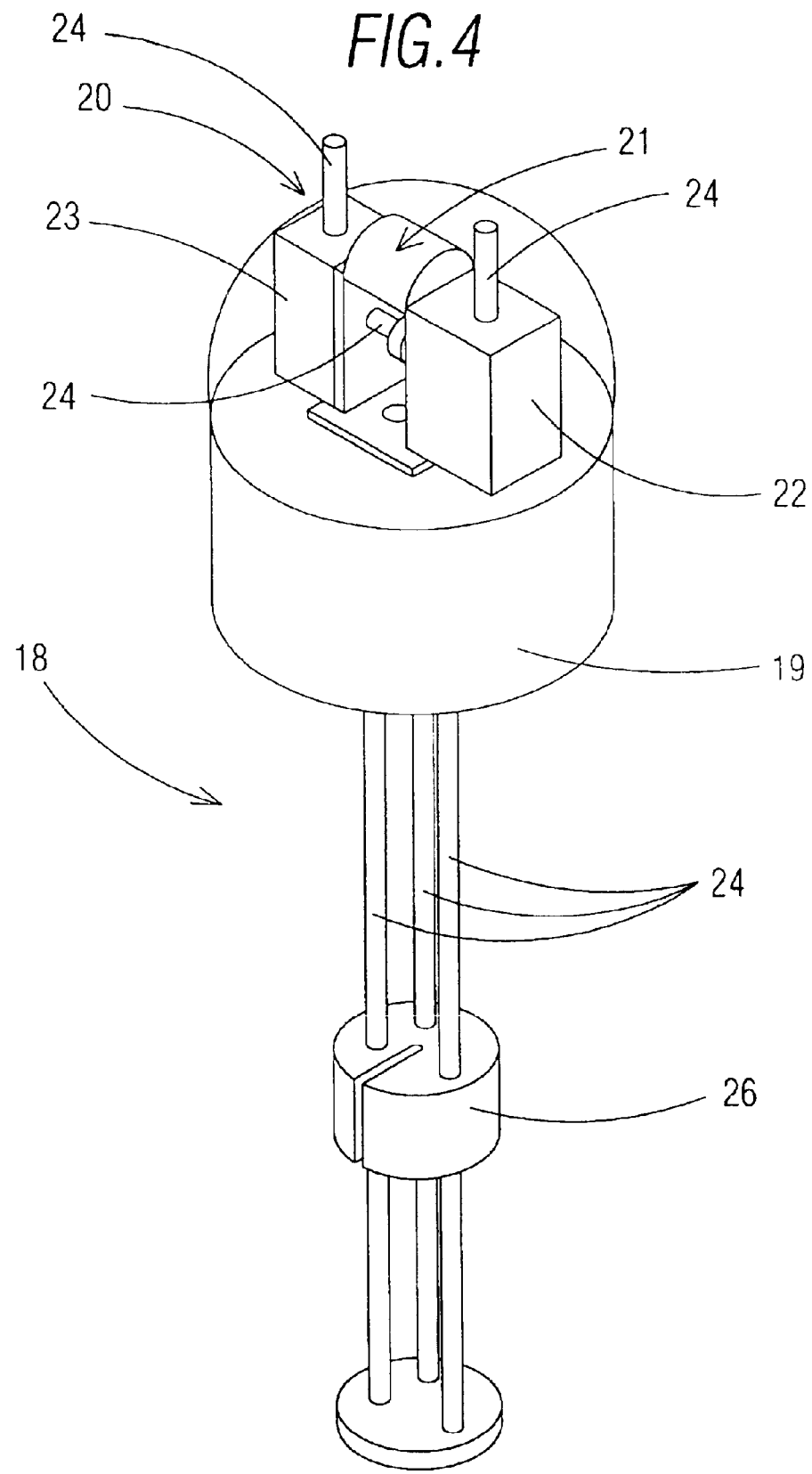

SYSTEM FOR GENERATING ENERGY FROM THE WAVES OF THE SEA

FIELD OF THE INVENTION

This invention relates to a system for generating energy from the waves of the sea.

BACKGROUND OF THE INVENTION

New sources of renewable energies with zero atmospheric pollution and involving minimum investment and optimum profitability are currently being studied and sought.

There exist in practice renewable sources such as solar energy and wind energy, but they are insufficient to provide the energy required by present-day society. It is for this reason that another method of obtaining energy has been sought, which consists in making use of the force exerted by the waves in the sea, and more specifically the rises and falls to which they give rise.

Known at present are various devices and systems for obtaining energy in this way, but said devices have the disadvantage of requiring in many cases a heavy investment for manufacturing them and installing them in the sea.

Another no less important disadvantage of these current systems once assembled is their complexity. This complexity means that they call for a high degree of maintenance, which often is not compensated by the energy output obtained. This low yield in the long term can lead to dismantling of the installations which use these systems.

OBJECTS AND SUMMARY OF THE INVENTION

The objective of the system of this invention is to solve the disadvantages presented by the systems known in the art, providing a number of advantages which are described below.

The system of generation of energy of this invention is of the type which includes at least one floating body.

According to one characteristic of the invention the floating body includes a device fitted inside said body for transforming the movement of the floating body into pneumatic or hydraulic energy and means for transmitting the energy to dry land or to a fixed structure.

Thanks to these characteristics, an energy-generation system is obtained with a manufacturing time and cost lower than the systems currently known. Moreover, the fact that the transforming device is fitted inside the floating body means that it is protected against corrosion caused by the water, against sharp movements caused by marine currents and against other possible outside agents which might harm or damage any of the components which make up the device. Similarly, as the entire assembly is inside the floating body, it is easier and faster to install in the sea, as all that needs to be done is to anchor the floating body on the sea bed. This last characteristic also permits the creation of an installation of several systems of the invention without the need for high investment and with the advantage that they are all connected to a single means of energy transmission.

According to one embodiment of the invention, the transforming device of the floating body includes a mechanism which transmits the movement of the floating body to a piston which compresses air at pressure.

Preferably, the mechanism is a chain attached to a piston which is in mesh with the spindle of the aforesaid piston.

Advantageously, the mechanism includes a device for recovery of the chain independently of the force of return of the wave, thereby ensuring correct operation of the system at all times. The lack of said device would disrupt the working cycle.

According to another aspect of the invention, the means of transmission include a duct for the circulation of air at pressure towards a pressurised-air accumulator.

According to one embodiment of the invention, the pressurised-air accumulation device is connected to at least one pneumatic motor which drives an alternator which produces electrical energy.

Preferably, the floating body is a buoy.

According to one embodiment of the invention, the recovery device includes at least one pair of drums mounted one on top of the other, around which the chain winds and unwinds.

Preferably, the drums have a grooved surface which prevents lateral movement of the chain with respect to the drum.

Moreover, the recovery device has a protective housing on its upper part.

According to another characteristic of the invention, the floating body includes means for being seen. Thanks to the presence of said means, the buoys on the sea can be located rapidly and clearly. These means can be beneficial in situations in which the meteorological conditions are adverse, permitting them to be located by craft which might be near them.

Preferably, the signalling means are powered by at least one battery which is rechargeable by photovoltaic cells.

Advantageously, the system of the invention includes a counterweight that provides the torque necessary to recover the chain in the movement of descent of the wave.

Alternatively, the mechanism of the transformation device is a chain attached to at least two pistons which mesh with the spindles of both pistons.

The invention also makes provision for the piston to include an automatic sequential change device, adjustable in function of the thrust force of the wave. This permits maximum use to be made of the energy production, as it should be borne in mind that the force produced during the ascent of the wave gradually increases. For this reason the working ratio must be adapted as the force received increases by using a sequential change.

BRIEF DESCRIPTION OF THE DRAWINGS

In order to facilitate the description of all that has been outlined above, some drawings are attached which, schematically and solely by way of non-restrictive example, show two embodiments of the system of the invention. In the drawings:

FIG. 2 is a perspective view of the recovery device of the system;

FIG. 3 is a schematic view of an installation which uses the energy generation system of the invention; and FIG. 4 is a perspective view of a second embodiment of the floating body of the invention.

DETAILED DESCRIPTION OF THE INVENTION

Figure 1:
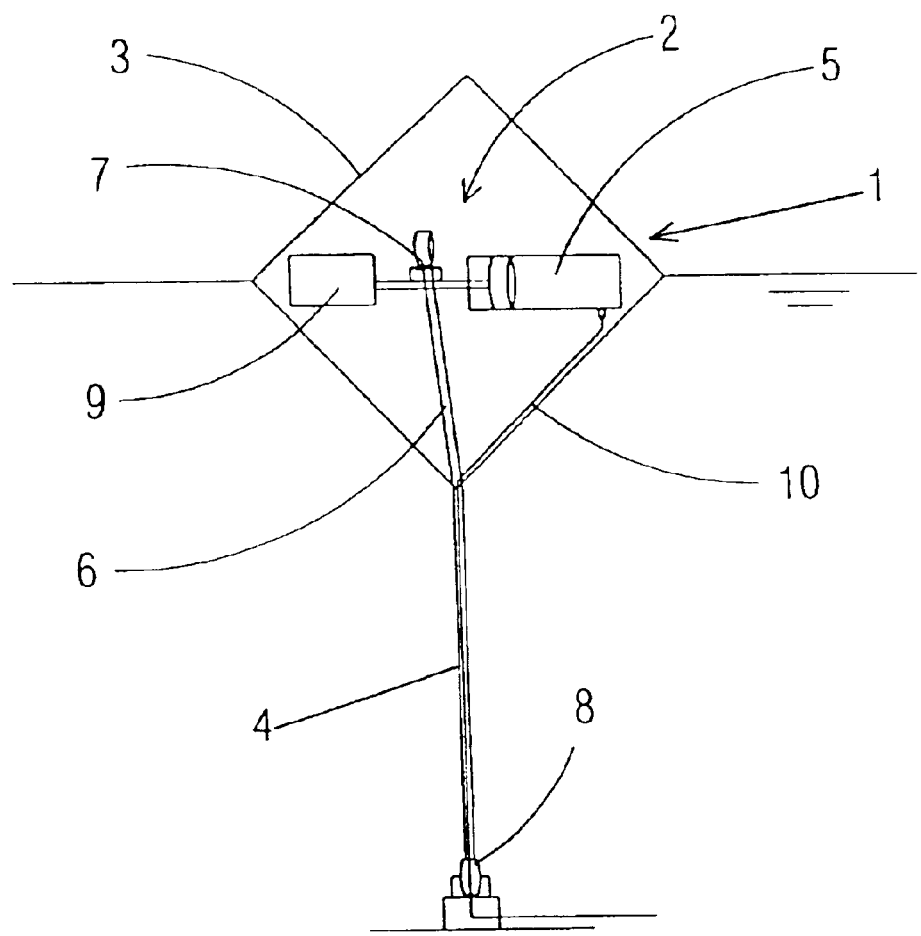
FIG. 1 is a schematic view of a first embodiment of the floating body of the invention, including the interior device.

As can be appreciated in FIG. 1, the energy generating system of the invention comprises a floating body 1 which includes inside it a device 2 for transforming the movement of the said body into air at pressure. This provides a system which is easy to construct, so that the manufacturing and maintenance costs are reduced considerably.

The floating body 1 is made up of a ballast buoy which includes in its interior a through-orifice. This orifice allows the buoy to be anchored down by means of a cable 4 or the like.

The interior device 2 is made up of a pneumatic piston 5 attached to a chain 6 by means of a system of gearwheels, shown schematically and marked with reference number 7, with said chain 6 being attached by its other end to the sea bed through a crown wheel 8, or by means of any other system of similar characteristics. The objective of the pneumatic piston 5 is to compress to an established pressure the largest number of liters of air coming from the exterior.

The length of the coiled chain 6 will depend on the difference between the low tide and the high tide plus the forecast height of the waves.

The piston 5 includes an automatic sequential change device (not shown), adjustable in function of the thrust force of the wave. In this way, the production of energy can be used to maximum advantage, as it must be taken into account that the force produced during the ascent of the wave increases. For this reason, the working ratio has be altered as the force received increases, by using a sequential change.

At the same time, the piston 5 of the transformation device 2 is attached by one end to a recovery device 9 which permits at all times, and independently of the force generated by the wave, the recovery of the chain to its initial position.

The compressed air obtained from the pneumatic piston 5 is taken through a duct 10 towards an air accumulator.

As can be appreciated in FIG. 1, the various elements and devices that take part in the obtaining of energy are situated inside the buoy 3, so that said elements are protected from corrosion and from the direct impact of the wave when it collides with the buoy 3.

FIG. 2 shows an embodiment of a recovery device which includes a pair of drums 11 and 12, with a grooved surface 13, arranged one on top of the other, around which there winds and unwinds the chain 6 (not shown) which is inserted into the device through a lower orifice. Both drums 11 and 12 are slightly displaced vertically in order to prevent relative travel between the chain and the drum. The upper drum 11 is of larger diameter than the lower drum 12, in order to prevent the chain abrading against the aforesaid lower drum 12. Moreover, the upper drum 11 includes a semicylindrical housing 14 which prevents the cable or chain 6 coming out of the grooves of the surface 13 of the drum 11 in the event of loss of tension of the chain 6 or cable.

In the lower part of the recovery device, more specifically between the lower orifice through which the chain 6 passes, two small pulleys 15 can be seen, which have the function of facilitating entry of the chain 6 onto the drums 11 and 16.

FIG. 3 shows an installation made up of two floating bodies 1, more specifically two buoys fitted with the device 2 of the invention, which take the compressed air obtained to a main duct 14 which transports said air to a compressed-air accumulator tank 15 situated in the coastal zone. Said main duct 14 is buried under the sea bed in order to prevent it being damaged by anchors and fishing nets.

The aforesaid device 15 is in turn attached to a plurality of conventional pneumatic motors 16, each one of which drives an alternator 17, thereby providing electrical energy which will subsequently be distributed to an electrical network.

Moreover, the buoy 3 is provided with signalling means (not shown) which mark the buoys 3 rapidly and clearly. These means are very useful in meteorological conditions adverse for sea transport, by avoiding possible collision of a craft with the buoys of the system.

The said signalling means are powered by batteries recharged by photovoltaic cells and small dynamoes.

The above description shows how easy it can be by using the system of the invention to construct an installation with a plurality of floating bodies 1, further taking into account that the device 2 would already be fitted inside the buoy 3 before it is set in the sea. This assembly system allows the system installation time to be reduced.

FIG. 4 shows a second embodiment of a floating body 18 of the system of the invention. Said body has a cylindrical section 19 whose upper part includes a plastic protective housing 20 to protect the devices inside it. Said figure shows a recovery device 21 of the same characteristics as the device shown in FIG. 2, on whose ends are two housings 22,23 which have inside them two pistons whose spindles correspond to the same spindle 24 of the recovery device 21.

The air supply required by the pistons is channelled through a duct 25 which projects outside the housing 20. Said duct 25 includes a filter for the elimination of humidity and a small electrical power-supply turbine.

The lower part of the floating body 18 has a counterweight 26 made up of a disc of considerable weight, for example 20 kg, which provides the necessary tension to the chain or cable of the recovery device 21. The disc can be moved along three stainless steel bars 27.

The materials used in the great majority of the components making up the system are light materials that are practically corrosion-free in water, such as aluminium.

The system of the invention for obtaining energy has the advantage that in the event of breakage or leakage of the buoy 3 no environmental contamination occurs. This is due to the fact that the fluid used is pressurised air. Similarly, no electromagnetic effects harmful for the fauna in the zone are produced under the sea.

Independent of the object of this invention are the materials used in manufacturing of the elements that make up the energy generation system described, together with the shapes and dimensions of same and all accessory details that might be presented, which may be replaced by others that are technically equivalent, as long as they do not affect its essential nature or depart from the sphere defined by the claims attached below.

What is claimed is:

1. System for generating energy from the waves of the sea, which includes at least one floating body (1,18), a submerged ballast and a chain or cable (6,4) connecting said submerged ballast and said floating body (1,18), and which further comprises a device (2) fitted inside said floating body (1,18) for transforming the movement of the floating body (1,18) into pneumatic or hydraulic energy and means for transmitting the energy to dry land or to a fixed structure, wherein said device (2) for transforming the movement comprises a recovery device (9,21) which permits the recovery of the chain or cable (6,4) to its initial coiled position, during the movement of descent of the wave, being said recovery device (9,21) fitted inside said floating body (1,18).

2. System as claimed in claim 1, wherein the recovery device (9) includes at least one pair of drums (11,12)

mounted one on top of the other, around which the chain (6) winds and unwinds.

3. System as claimed in claim 1, wherein the transforming device (2) of the floating body (1) includes a mechanism which transmits the movement of the floating body to a piston (5) which compresses air at pressure.

4. System as claimed in claim 3, wherein the device (2) for transforming the movement comprises a pressurized-air accumulator connected to at least one pneumatic motor which drives an alternator.

5. System as claimed in claim 3, wherein the means of transmission include a duct (10) for the circulation of air at pressure towards a pressurised-air accumulator (15).

6. System as claimed in claim 5, wherein the pressurised-air accumulation device (15) is connected to at least one pneumatic motor which drives an alternator (17).

7. System as claimed in claim 3, wherein the mechanism is a chain (6) attached to a piston (5) which is in mesh with the spindle of the aforesaid piston (5).

8. System as claimed in claim 1, wherein the floating body (1) is a buoy (3).

9. System as claimed in claim 2, wherein the drums (11,12) have a grooved surface (13).

10. System as claimed in claim 1, wherein the recovery device (9) has a protective housing (14) on its upper part.

11. System as claimed in claim 1, wherein the floating body includes means for being seen.

12. System as claimed in claim 11, wherein signalling means are powered by at least one battery which is rechargeable by photovoltaic cells.

13. System as claimed in claim 1, wherein it includes a counterweight (26) that provides the torque necessary to maintain guided the chain or cable (6,4) in the movement of descent of the wave.

14. System as claimed in claim 3, wherein the mechanism is a chain attached to at least two pistons which meshes with the spindles of both pistons.

15. System as claimed in claim 3, wherein the piston includes an automatic sequential change device, adjustable in function of the thrust force of the wave.

* * * * *